May 28, 1963 K. HOBBS 3,091,452
HOLDER FOR PLURALITIES OF OBJECTS
Filed Feb. 9, 1960

INVENTOR
KENNETH HOBBS
BY
AGENT

United States Patent Office 3,091,452
Patented May 28, 1963

3,091,452
HOLDER FOR PLURALITIES OF OBJECTS
Kenneth Hobbs, Bassett, Southampton, Hants, England, assignor to North American Philips Company, Inc., New York, N.Y., a corporation of Delaware
Filed Feb. 9, 1960, Ser. No. 7,565
Claims priority, application Great Britain Mar. 9, 1959
3 Claims. (Cl. 269—68)

The present invention relates to holders for pluralities of objects.

According to the present invention, in a holder for a plurality of objects and for use in a mass production process, the centers of the holding means for the objects are spaced apart in the direction of length of the holder by unit distance, the sum of the distances between the centers of the end holding means and the adjacent ends of the holder in the direction of length of the holder is also the unit distance, and indexing means is provided on the holder with the unit spacing between adjacent indexing positions.

The distances between the centers of the end holding means and the adjacent ends of the holders in the direction of length of the holder may be each one half the unit spacing.

Each holding means may comprise an aperture extending into the body of the holder. The ends of the apertures within the body of the holder may terminate in a channel extending longitudinally of the holder and having a longitudinally extending groove for accommodating a retaining or stop member.

The indexing means may be provided on the holder laterally of the position of the holding means.

The holder may consist of two identical parts which are secured together.

Figure 1:
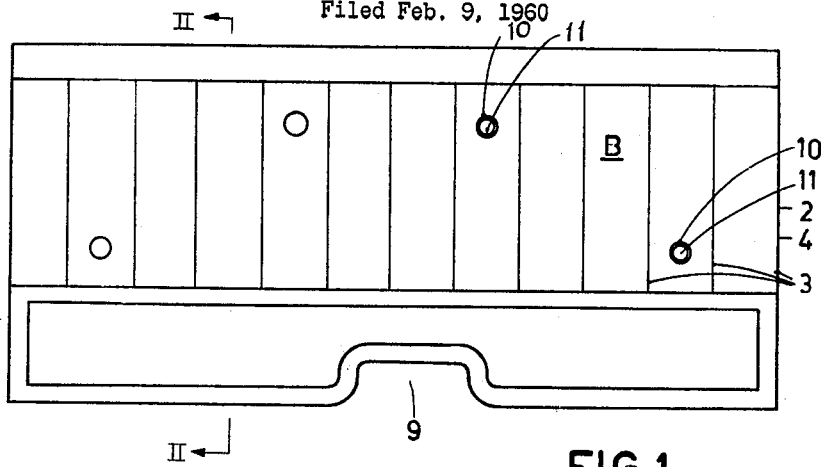
Figure 2:
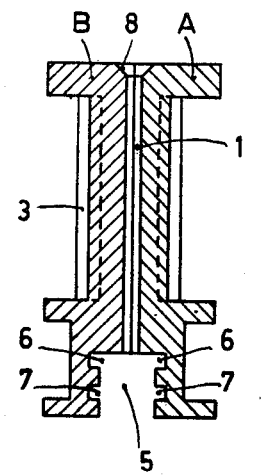
Figure 3:
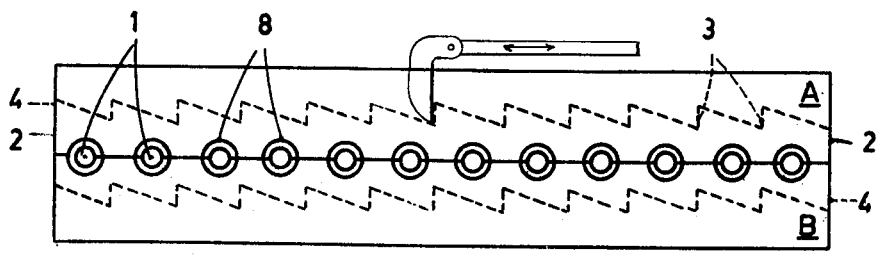

One embodiment of a holder according to the present invention will now be described by way of example with reference to the accompanying diagrammatic drawing, in which:

FIGURE 1 is a side elevation;
FIGURE 2 is a cross section taken along the line II—II of FIGURE 1;
FIG. 3 is a plan view of the holder.

Referring now to the figures, the holder comprises two identical parts A and B.

Each part comprises twelve grooves of semi-circular section which, when the parts are secured together, form apertures 1 inxtending into the elongated body of the holder and constitute holding means for objects to be held in the holder. The centers of the adjacent apertures are separated in the longitudinal direction of the holder by unit distance and the centers of the apertures 1 adjacent the ends of the holder are separated in the direction of length of the holder from the adjacent ends 2 of the holder by one half the unit distance.

Ratchet indexing means 14 is provided on the holder laterally of the position of the holding means and is adapted to cooperate with a pawl 12 for moving the holder in steps of the unit distance longitudinally of the holder, the pitch of the indexing positions 3 being the unit distance. The final indexing positions 4 are flush with the ends 2. It will be appreciated that projections may extend beyond the ends 2 as long as the position of a holder relative to another following or preceding holder in contact therewith is determined by the ends 2.

Each part A and B comprises a channel section which when the parts are secured together, form a channel 5 extending longitudinally of the holder. The apertures 1 terminate in the channel 5. At each side of the channel 5 longitudinally extending grooves 6, 6 and 7, 7 are provided for accommodating a retaining or stop member.

The apertures 1 are flared at the tops 8 to facilitate insertion of objects.

A recess 9 is provided in the walls of the channel 5 to facilitate automatic transfer of the holder from one position or one machine to another, for example, with the aid of an arm.

Each part A and B has two securing apertures 10 and two securing projections 11. When the parts A and B are placed together, each projection 11 fits into the corresponding aperture 10 and is then deformed to secure the parts together.

The parts A and B may readily be cast in a mould and may be made from metal or plastic.

The holder described above is primarily intended for use in the manufacture of semi-conductor devices metal conductors being inserted in the apertures 1 and the semi-conductor crystalline body projecting above the holder for carriage through a series of operations. With the holders described above the processes may be continuous, the spacing being constant with unit spacing also between the final holding means of one holder and the initial holding means of the subsequent holder.

If the metal conductors are of equal lengths the heights of the crystalline bodies may be kept constant for two different lengths of metal conductors by permitting the ends of the conductors to abut on a rigid stop plate inserted in the grooves 6, 6 or 7, 7. As an alternative, the conductors may be irregular in length and all greater than a given length and each object pressed down to a definite level against a resilient stop member retained in position by the grooves 6, 6 and/or 7, 7. As a further alternative the grooves 6, 6 and/or 7, 7 may retain in position a magnet or a series of magnets for retaining objects having magnetic conductors in position even when the holder is turned upside down.

The rigid stop member may be a rectangular plate of hard material, for example of metal or cardboard, and the resilient stop member may be a rectangular plate of rubber. The retaining magnet may also be a rectangular plate of permanent magnetic material magnetized in the direction of its thickness.

The holder described including the ratchet indexing means, together with the pawl constitutes a holder assembly.

It will be obvious that other embodiments may readily be devised within the scope of the present invention for holding objects in the manufacture of devices other than semi-conductive devices.

What is claimed is:

1. A holder for a plurality of semi-conductor devices in mass production constituted of two substantially identical parts together forming a multiplicity of spaced apertures forming the holding means for said semi-conductor devices, said apertures being spaced in the direction of the length of the holder by a unit distance, said holder being adapted for longitudinal movement, an elongated longitudinal channel located in said holder, and said apertures in said holder terminating in said channel, said channel being provided with longitudinal grooves adapted for accommodating a stop member.

2. A holder assembly including a holder for a plurality of semi-conductor devices in mass production constituted of an elongated body having a multiplicity of spaced apertures forming the holding means for said semi-conductor devices, said apertures being spaced in the direction of the length of the holder by a unit distance, said holder being adapted for longitudinal movement, an elongated longitudinal channel located in said holder, and said apertures in said holder terminating in said channel, said channel being provided with longitudinal grooves adapted for accommodating a stop member.

3. A holder assembly including a holder as claimed in claim 2 further comprising means for moving said holder stepwise in a longitudinal direction, said means including a ratchet indexing means provided on a side of the holder, and a pawl engaging said ratchet indexing means for moving the holder in steps of the unit distance.

References Cited in the file of this patent

UNITED STATES PATENTS

| | | |
|---|---|---|
| 815,787 | Blake | Mar. 20, 1906 |
| 2,107,134 | Weinlich et al. | Feb. 1, 1938 |
| 2,415,037 | Redmer | Jan. 28, 1947 |
| 2,743,693 | Schaper | May 1, 1956 |

FOREIGN PATENTS

| | | |
|---|---|---|
| 554,113 | Italy | Jan. 7, 1957 |
| 1,177,729 | France | Dec. 8, 1958 |